Patented Feb. 26, 1929.

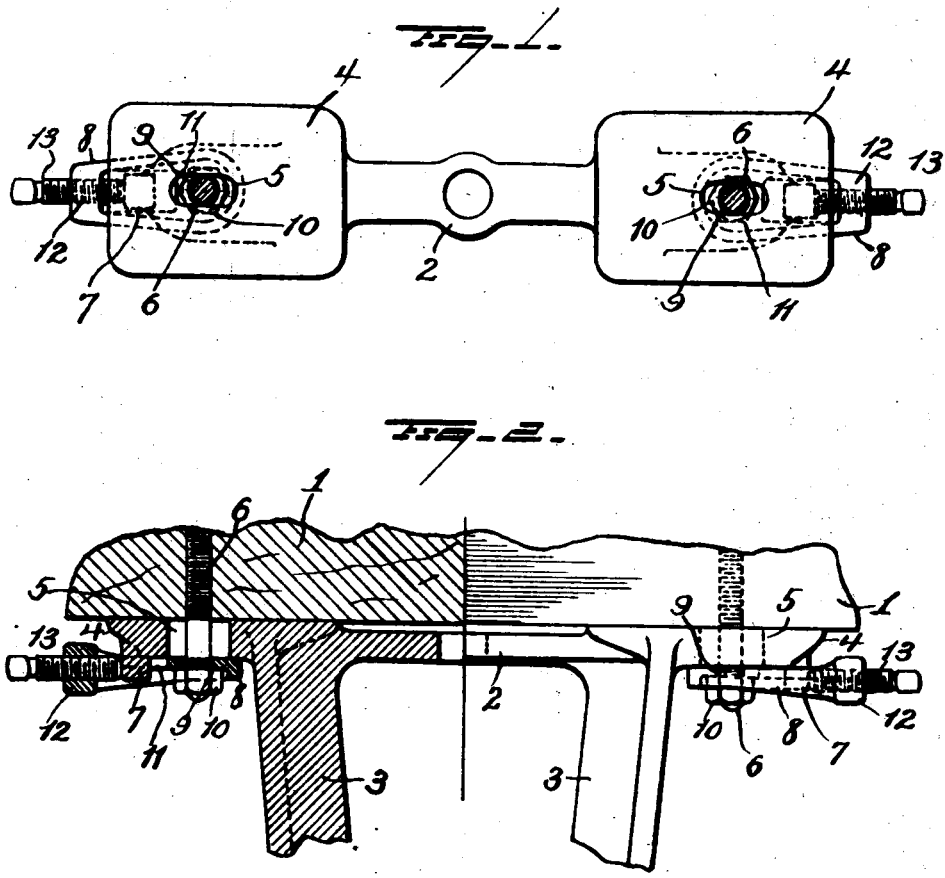

1,703,767

UNITED STATES PATENT OFFICE.

JOHN P. GOLDEN, OF COLUMBUS, GEORGIA.

ADJUSTABLE SHAFT HANGER.

Application filed May 12, 1927. Serial No. 190,832.

This invention relates to shaft hangers, pillow blocks, and other supports for shaft bearings, and has for its object the provision of simple means for adjusting the support in alining the shaft and for securing the support after adjustment. Another object is to effect the adjustment without disturbing the elements which secure the hanger to a fixed support and to utilize a part of the adjusting mechanism as a seat for the hanger-securing nut. A construction whereby these objects are attained is illustrated in the accompanying drawing, the invention residing in certain novel features which will be particularly pointed out in the claims following a detailed description.

In the drawing, Figure 1 is a top plan view of a shaft hanger with the securing bolts in horizontal section;

Figure 2 is a view of the upper part of the hanger partly in vertical section.

The reference numeral 1 indicates a portion of a fixed support, such as a girder or beam, and 2 indicates the upper end of a yoke or hanger which is constructed at its lower end in any preferred manner to carry a shaft. The top of the yoke projects laterally beyond the sides 3 and are expanded, as indicated at 4, to obtain wide bearings against the beam or other fixed support. In each extended end portion of the yoke is a longitudinal slot 5 accommodating the bolts 6 by which the device is held on the beam and at the end of each extension is a depending lug 7 alined with the adjacent slot 5. Against the under side of each extension is placed a plate 8 having an opening 9 therethrough to accommodate the bolt 6, and a nut 10 is mounted on the lower end of the bolt to be home against the plate for securing the device in place, the plate serving as a washer bridging the bolt hole or slot 5. The plate 8 is elongated so that one end projects beyond the end extension of the hanger and it is provided with a longitudinal slot 11 through which the lug 7 projects, the outer extremity of the plate being enlarged to form a nut or threaded bearing 12 through which passes and is engaged an adjusting screw 13 having its inner end bearing against the lug 7.

It will be evident from the foregoing description, taken in connection with the accompanying drawing that if the nuts 10 be turned home, the hanger will be firmly secured in place. If the hanger should be out of alinement, the nuts are slightly loosened so that the hanger will still be supported but may be shifted along the line of the slots 5. Assuming that the hanger is to be shifted to the right, the screw 13 at the right side is retracted and the screw 13 at the left side is rotated to advance and, inasmuch as it is in contact with the lug 7, it will force the entire hanger to the right, the hanger sliding on the washer plates 8 which are held against movement by the fastening bolts 6. The slots 5 and 11, however, permit the desired movement of the hanger and guide it in a rectilinear path at a right angle to the axis of the shaft mounted in the hanger. After the hanger has been adjusted as desired, the nuts 10 are again turned home and the adjusting screw 13 at the right side is returned to its position in contact with the adjacent lug 7, the hanger being thus firmly secured. Of course, reverse manipulation of the two adjusting screws will effect adjustment of the hanger to the left. The device is exceedingly simple and eliminates the adjustable base plate now generally employed. The mechanism is easily manipulated and will rapidly effect a very accurate adjustment of the hanger without applying any deforming strain thereto.

Having fully described my invention what I claim as new and desire to secure by Letters-Patent, is:—

1. The combination of a shaft hanger, means for securing the hanger to a fixed support, said means including a slotted washer plate, a lug on the hanger engaged in the slot of said washer plate, and an adjusting screw mounted in the washer plate and bearing against said lug.

2. The combination of a shaft hanger having lateral end extensions and provided with longitudinal slots in the extensions, lugs on the under sides of the extensions aligned with the slots, securing bolts passing through the slots in the extensions into a fixed support, nuts on said bolts, washer plates encircling the bolts between said nuts and extensions of the hanger, said plates being held stationary by said bolts and having longitudinal slots receiving the lugs on the extensions and provided with threaded bearings alined with said slots, and adjusting screws mounted in said bearings and having their ends in contact with said lugs, the slots in the hanger and the plates being alined whereby to hold the hanger to a rectilinear path when being adjusted.

In testimony whereof, I have signed this specification.

JOHN P. GOLDEN.